US011645387B2

(12) United States Patent
Seo et al.

(10) Patent No.: US 11,645,387 B2
(45) Date of Patent: May 9, 2023

(54) ELECTRONIC DEVICE FOR CLASSIFYING MALICIOUS CODE AND OPERATION METHOD THEREOF

(71) Applicants: Samsung Electronics Co., Ltd., Suwon-si (KR); Korea University Research and Business Foundation, Seoul (KR)

(72) Inventors: Jaewoo Seo, Suwon-si (KR); Suin Kang, Seoul (KR); Mincheol Kim, Seoul (KR); Hyemin Kim, Seoul (KR); Huykang Kim, Seoul (KR); Kiseok Do, Suwon-si (KR); Jooyeon Moon, Seoul (KR); Hyunmin Song, Seoul (KR); Sejoon Oh, Seoul (KR); Sooyeon Lee, Seoul (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 393 days.

(21) Appl. No.: 16/965,950

(22) PCT Filed: Jan. 29, 2019

(86) PCT No.: PCT/KR2019/001218
§ 371 (c)(1),
(2) Date: Jul. 29, 2020

(87) PCT Pub. No.: WO2019/147101
PCT Pub. Date: Aug. 1, 2019

(65) Prior Publication Data
US 2021/0081531 A1 Mar. 18, 2021

(30) Foreign Application Priority Data

Jan. 29, 2018 (KR) .................. 10-2018-0010905

(51) Int. Cl.
*G06F 21/56* (2013.01)
*G06F 8/53* (2018.01)
(Continued)

(52) U.S. Cl.
CPC .............. *G06F 21/561* (2013.01); *G06F 8/53* (2013.01); *G06F 18/22* (2023.01); *G06F 21/563* (2013.01);
(Continued)

(58) Field of Classification Search
CPC .... G06F 21/563; G06F 8/53; G06F 2221/033; G06K 9/6215
See application file for complete search history.

(56) References Cited

U.S. PATENT DOCUMENTS 9,185,119 B1 11/2015 Tamersoy et al.
2011/0239294 A1 9/2011 Kim et al.
(Continued)

FOREIGN PATENT DOCUMENTS

KR 10-1083311 B1 11/2011
KR 10-1404882 B1 6/2014
(Continued)

OTHER PUBLICATIONS

Korean Intellectual Property Office, "Notification of the Reasons for Rejection" dated Jan. 9, 2022, in connection with Korean Patent Application No. 10-2018-0010905, 11 pages.
(Continued)

*Primary Examiner* — Paul E Callahan

(57) ABSTRACT

An electronic device is disclosed. An electronic device according to various embodiments comprises: a processor; and a memory electrically connected to the processor, wherein the processor may be configured to: obtain a plurality of first parameters associated with attributes of at least one malicious code and a plurality of second param-
(Continued)

eters associated with a system in which the at least one malicious code is executed; obtain a similarity on the basis of a first comparison result according to a first comparison method between the plurality of first parameters and a second comparison result according to a second comparison method between the plurality of second parameters; and classify the at least one malicious code into at least one cluster on the basis of the similarity between the at least one malicious code. Other various embodiments may be provided.

7 Claims, 12 Drawing Sheets

(51) Int. Cl.
  *G06F 18/22* (2023.01)
  *G06V 10/74* (2022.01)
(52) U.S. Cl.
  CPC ...... *G06V 10/761* (2022.01); *G06F 2221/033* (2013.01)

(56) References Cited

U.S. PATENT DOCUMENTS

2016/0072833 A1  3/2016  Kim et al.
2017/0251003 A1*  8/2017  Rostami-Hesarsorkh ................... G06F 21/562
2018/0048658 A1*  2/2018  Hittel ................. H04L 63/1433

FOREIGN PATENT DOCUMENTS

| KR | 10-2016-0028724 A | 3/2016 |
| KR | 10-2016-0031589 A | 3/2016 |
| KR | 10-1605783 B1 | 3/2016 |
| KR | 10-1725399 B1 | 4/2017 |
| KR | 10-1815968 B1 | 1/2018 |

OTHER PUBLICATIONS

Kim et al., "A Module-based System for Measuring Similarity of Windows Executable Files" Journal of the Korean Society for Software Appraisal, No. 10, No. 2, Feb. 2, 2014, 7 pages.

Oliver et al., "TLSH—A Locality Sensitive Hash" Trend Micro, 4th Cybercrime and Trustworthy Computing Workshop, Sydney, Nov. 2013, 19 pages.

International Search Report and Written Opinion of the International Searching Authority in connection with International Application No. PCT/KR2019/001218 dated May 13, 2019, 10 pages.

Park, et al., "An Automatic Malware Classification System using String List and APIs," Journal of Security Engineering, vol. 8, No. 5, Oct. 2011, 17 pages.

* cited by examiner

| ID | Section |
|----|---------|
| 1 | [".bss","",".comment","",".ctors","",".data","",".dtors","",".eh_frame","",".fini",".gcc_except_table",".gnu.attributes",".g... |
| 2 | [".bss","",".comment","",".ctors","",".data","",".dtors","",".data.rel.ro",".debug_abbrev",".debug_aranges",".debug_info","",".de... |
| 3 | [".bss","",".comment","",".ctors","",".data","",".dtors","",".eh_frame","",".fini",".got",".init",".jcr",".mdebug.abi32",".pdr... |
| 4 | [".bss","",".comment","",".ctors","",".data","",".dynamic",".dynstr",".dynsym","",".eh_frame","",".eh_frame_hdr","",".fini",".fini_arr... |
| 5 | [".bss","",".comment","",".ctors","",".data","",".data.rel.ro",".dtors","",".eh_frame","",".fini",".gcc_except_table",".got... |
| 6 | [".bss","",".comment","",".ctors","",".data","",".data.rel.ro",".debug_abbrev","",".debug_aranges","",".debug_frame",".d... |

FIG.5

| ID | CALLS |
|---|---|
| 1 | ["GetsystemTimeAsFileTime","SetUnhandledExceptionFilter","FindFirstFileExW","NtClose","FindFirstFileE... |
| 2 | ["FindFirstExW","NtDelayExecution","GetTempPathW","FindFirstExW","NtDelayExecution","LdrG... |
| 3 | ["GetsystemTimeAsFileTime","SetUnhandledExceptionFilter","NtOpenThread","LdrGetDllHandle","LdrGet... |
| 4 | ["GetsystemTimeAsFileTime","SetUnhandledExceptionFilter","NtClose","NtOpenKey","NtOpenKey","NtC... |
| 5 | ["GetsystemTimeAsFileTime","NtClose","NtOpenKey","NtQueryValueKey","NtClose","NtOpenKey","NtQ... |
| 6 | ["InternetOpenA","LdrGetProcedureAddress","ReadProcessMemory","ReadProcessMemory","ReadProc... |

FIG.6

| MALICIOUS CODE ID | DIAGNOSIS NAME (Kaspersky) | Nilsimsa Hash (Hex) | SIMILARITY |
|---|---|---|---|
| MALICIOUS CODE 1 | Trojan-Ransom.Win32.Wanna.m | 3e2be5319bc0fa3d35911dfd7011c01fa82c06080c40eb0e431cd5033bd7173e | REFERENCE |
| MALICIOUS CODE 2 | rojan-Random.Win32.Wanna.m | 3e2be5319bc0fa3d35911dfd7811c01ea82c06080c40eb0e431cd5033bd7163e | 0.9883 |
| MALICIOUS CODE 3 | HEUR:Trojan.Win32.Generic | 287a69741b41763731805414520288192831040445a189e34a9dc129fbc03e28 | 0.6758 |
| MALICIOUS CODE 4 | Backdoor.Win32.GF-j | 49524a00c223293c8e0e22aea6181e8d1be2807f28c442805236605080b231640 | 0.4805 |

FIG.10

| ID 1 | ID 2 | APIcall_Similarity | symbol_Similarity | section_Similarity | all_Similarity |
|---|---|---|---|---|---|
| 4 | 2 | 0.726562 | 0.013082 | 0.307692 | 0.349112 |
| 5 | 2 | 0.84375 | 0.322629 | 0.710526 | 0.625635 |
| 5 | 4 | 0.678688 | 0.007248 | 0.357143 | 0.348026 |
| 6 | 2 | 0.71875 | 0.32206 | 0.775 | 0.60527 |
| 6 | 4 | 0.648438 | 0.015663 | 0.3125 | 0.325534 |
| 6 | 5 | 0.671875 | 0.223036 | 0.666667 | 0.520526 |
| 8 | 2 | 0.761719 | 0.087811 | 0.394737 | 0.414756 |
| 8 | 4 | 0.691406 | 0.028986 | 0.40625 | 0.375547 |

US 11,645,387 B2

ELECTRONIC DEVICE FOR CLASSIFYING MALICIOUS CODE AND OPERATION METHOD THEREOF

CROSS-REFERENCE TO RELATED APPLICATIONS

This application is a National Phase Entry of PCT International Application No. PCT/KR2019/001218, which was filed on Jan. 29, 2019 and claims priority to Korean Patent Application No. 10-2018-0010905, which was filed on Jan. 29, 2018 in the Korean Intellectual Property Office, the contents of which are incorporated herein by reference.

BACKGROUND

1. Field

Various embodiments relate to an electronic device classifying malicious code based on various parameters associated with the malicious code and a method for operating the same.

2. Description of the Related Art

Malicious code also known as malware is a term for all types of software that may negatively affect computers. Malicious codes with similar features exhibit similar ways of infection or symptoms on the computer. Thus, classifying malicious codes with similar features into groups allows a malicious code newly discovered to be handled in a similar manner to those similar thereto.

According to various embodiments, methods for analyzing malicious code include code static analysis methods, which disassemble malicious code, and code dynamic analysis methods, which analyze variations occurring upon directly executing the malicious code on the system using a runtime debugging scheme.

SUMMARY

The use of only either the code static analysis method or code dynamic analysis method for analyzing malicious code may deteriorate the reliability of the result of analysis.

According to various embodiments, both the code dynamic analysis method and the code static analysis method may be used to analyze malicious code and, according to the result of analysis, tie similarity between malicious codes may be obtained and malicious codes may be classified into similar groups.

According to various embodiments, an electronic device (e.g., the electronic device 101 of FIG. 1) comprises a processor and a memory electrically connected to the processor, wherein the processor may be configured to obtain a plurality of first parameters associated with an attribute of at least one malicious code and a plurality of second parameters associated with a system where the at least one malicious code is executed, obtain a similarity between the at least one malicious code based on a first comparison result according to a first comparison scheme between the plurality of first parameters and a second comparison result according to a second comparison scheme between the plurality of second parameters, and classify the at least one malicious code into at least one group based on the obtained similarity.

According to various embodiments, a method of classifying malicious code may comprise obtaining a plurality of first parameters associated with an attribute of at least one malicious code and a plurality of second parameters associated with a system where the at least one malicious code is executed, obtaining a similarity between the at least one malicious code based on a first comparison result according to a first comparison scheme between the plurality of first parameters and a second comparison result according to a second comparison scheme between the plurality of second parameters, and classifying the at least one malicious code into at least one group based on the obtained similarity.

According to various embodiments, there is provided a non-transitory computer-readable recording medium retaining a program executed on a computer, wherein the program may be executed by a processor to enable the processor to perform the operations of classifying malicious code which may comprise obtaining a plurality of first parameters associated with an attribute of at least one malicious code and a plurality of second parameters associated with a system where the at least one malicious code is executed, obtaining a similarity between the at least one malicious code based on a first comparison result according to a first comparison scheme between the plurality of first parameters and a second comparison result according to a second comparison scheme between the plurality of second parameters, and classifying the at least one malicious code into at least one group based on the obtained similarity.

According to various embodiments, the similarity may be obtained and malicious codes may be classified into groups based on the results of code static analysis and code dynamic analysis on malicious code. Further, a network graph for malicious codes may be generated based on the obtained similarity and classified groups, visualizing the relationship between the malicious codes.

BRIEF DESCRIPTION OF THE DRAWINGS

FIG. 5 illustrates an example of a plurality of first parameters associated with an attribute of malicious code according to various embodiments;

FIG. 6 illustrates an example of a plurality of second parameters associated with a system where malicious code is executed according to various embodiments;

FIGS. 9 and 10 are views illustrating an example of obtaining a similarity by comparing a plurality of second parameters according to various embodiments;

DETAILED DESCRIPTION

Figure 1:
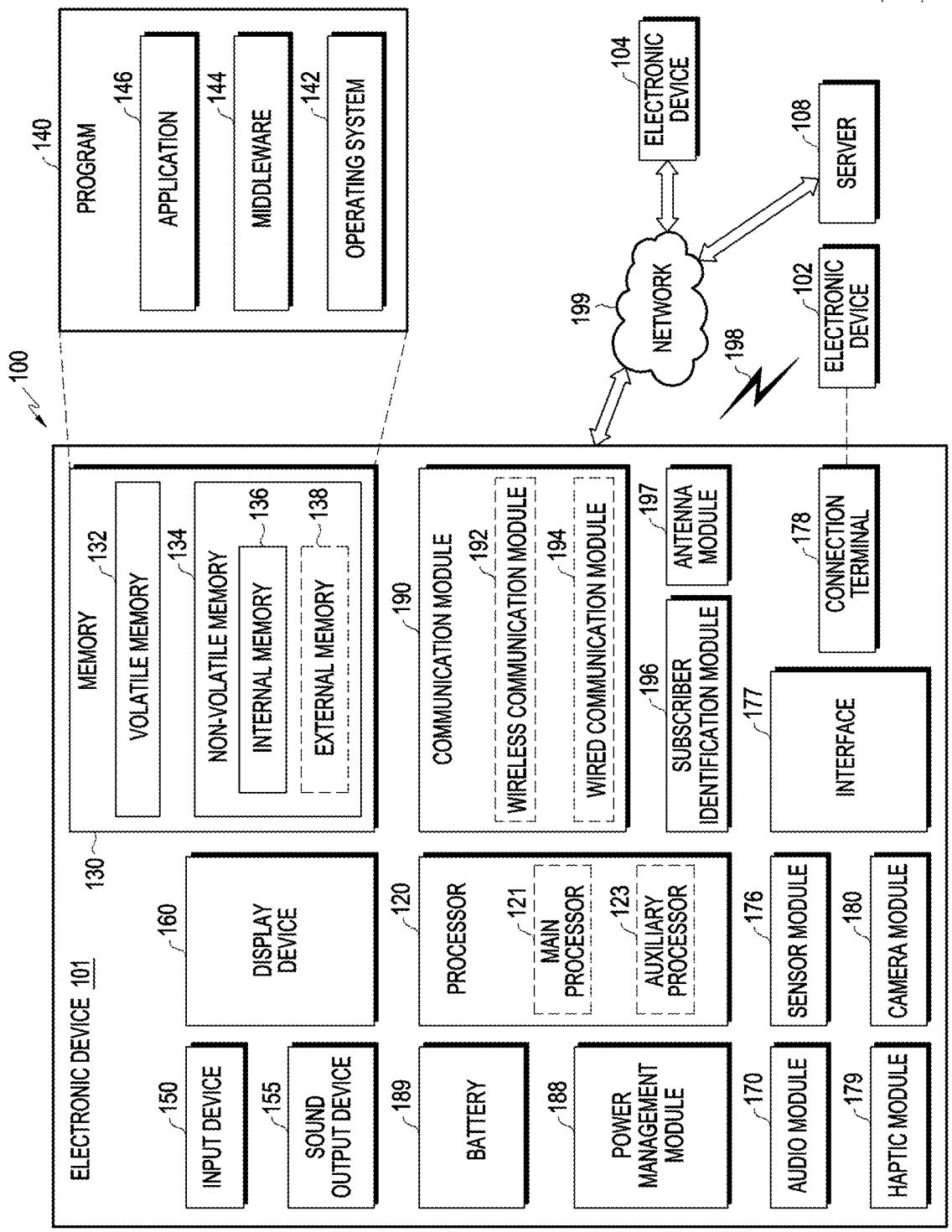
FIG. 1 illustrates a network environment including an electronic device according to various embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
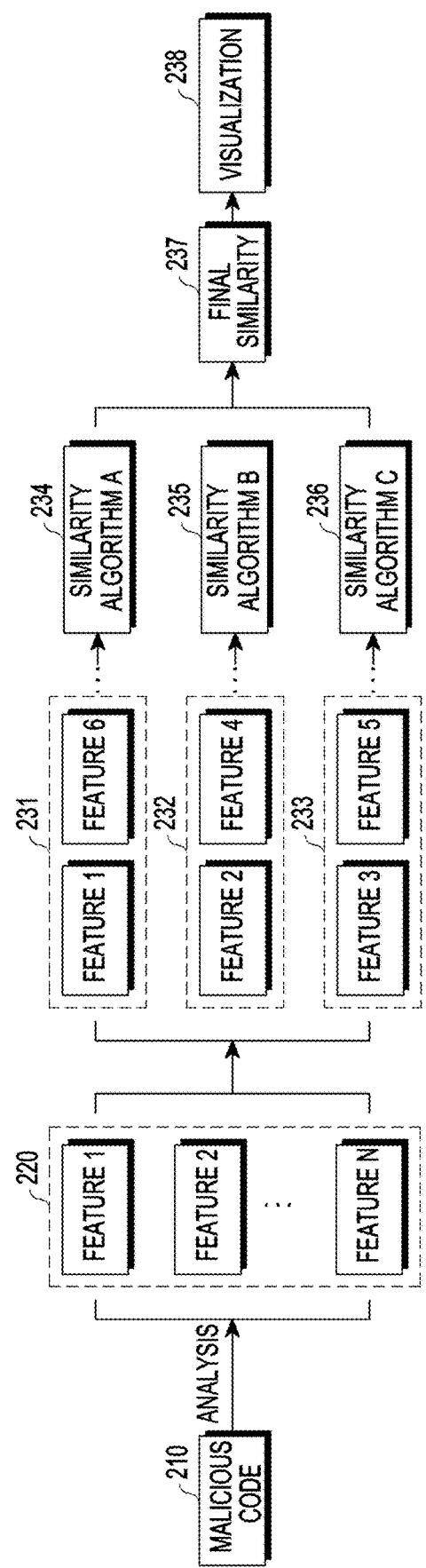
FIG. 2 is a view illustrating an example method for classifying malicious code according to various embodiments.

FIG. 2 is a view illustrating an example method for classifying malicious code according to various embodiments.

According to various embodiments of the present invention, a processor (e.g., the processor 120 of FIG. 1) of an electronic device (e.g., the electronic device 101 of FIG. 1) may analyze at least one malicious code to obtain a similarity between the malicious codes, and classify at least one malicious code into at least one group. A memory (e.g., the memory 130 of FIG. 1) of the electronic device 101 may store information about at least one malicious code classified into at least one group.

According to various embodiments, the processor 120 may analyze the malicious code 210, generating various features 220. The processor 120 may generate the features 220 using a code dynamic analysis method and code static analysis method on the malicious code 210. The features 220 may be configured to be obtained in a predetermined number by the user or the processor 120, and each feature 220 may be a set of particular parameters associated with the malicious code 210. For example, the processor 120 may generate feature 1, which is a set of a plurality of first parameters associated with an attribute of the malicious code 210, or obtain feature 2, which is a set of a plurality of second parameters associated with the system where at least one malicious code is executed. The processor 120 may obtain the plurality of first parameters based on the attribute of the malicious code 210 itself using the code static analysis method. For example, the first parameter may be obtained based on at least one of the attributes of the file name and file size of the malicious code 210 and information assigned per section, but the attributes of determining the first parameter are not limited to the above examples, and the first parameter may be determined based on various attributes of the malicious code 210. The processor 120 may generate the second parameter associated with the system of the malicious code 210 based on the operation similarity of the malicious code 210 on the system using the code dynamic analysis method. For example, the processor 120 may generate the second parameter using a call sequence invoked from the operating system where the malicious code 210 is executed. The memory 130 may store the obtained first parameter and the second parameter.

Figure 3:
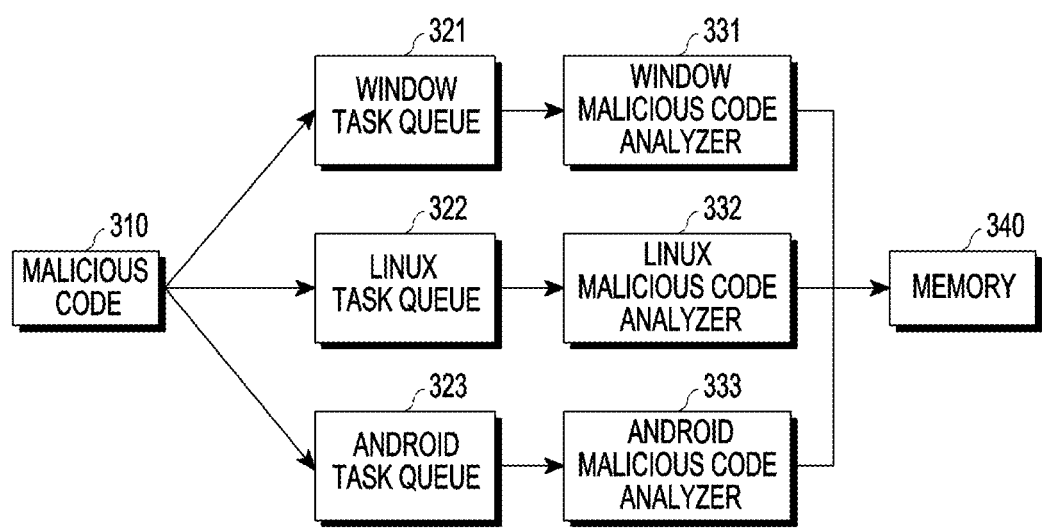
FIG. 3 is a view illustrating an example method for analyzing malicious code depending on the operation system according to various embodiments.

FIG. 3 is a view illustrating an example method for analyzing malicious code depending on the operation system according to various embodiments.

According to various embodiments, a processor (e.g., the processor 120 of FIG. 1) of an electronic device (e.g., the electronic device 101 of FIG. 1) may identify whether a malicious code 310 to be analyzed is a malicious code 310 already stored in the memory 130. For example, the processor 120 may identify the format of the malicious code 310 and then identify whether the malicious code 310 is one already stored in the memory 130 using a hash. When the malicious code 310 is identified to be not the malicious code 310 stored in the memory 130, the processor 120 may identify what system, e.g., operating system, the malicious code 310 is executed on. For example, when the malicious code 310 is identified to be executed on Windows, the processor 120 may assign the malicious code 310 to a Windows task queue 321. Similarly, when the malicious code 310 is identified to be executed on Linux, the processor 120 may assign the malicious code 310 to a Linux task queue 322 and, when the malicious code 310 is identified to be executed on Android, the processor 120 may assign the malicious code 310 to an Android task queue 323. The malicious code 310 assigned to any one of the Windows task queue 322, the Linux task queue 322, and the Android task queue 323 may be assigned to any one of a Windows malicious code analyzer 331, a Linux malicious code analyzer 332, and an Android malicious code analyzer 333. The Windows malicious code analyzer 331, the Linux malicious code analyzer 332, and the Android malicious code analyzer 333 may perform the same operations as those of the processor 120, generating a plurality of first parameters and a plurality of second parameters associated with the malicious code 310. The processor 120 may store the first parameter and second parameter of the malicious code 310 in the memory 340 (e.g., the memory 130 of FIG. 1) or may obtain a similarity to other malicious code using the first parameter and the second parameter.

Referring to FIG. 2, upon obtaining features 220, which are a set of parameters, according to the result of analysis of the malicious code 210, the processor 120 may input the features 220 to a similarity algorithm suitable for the characteristics of the features 220. For example, the processor 120 may input feature 1 and feature 6 (231), of n features 220, to similarity algorithm A 234 and feature 2 and feature 4 (232) to similarity algorithm B 235 and assign feature 3 and feature 5 (233) to similarity algorithm C 236, thereby identifying or obtaining the similarity between the malicious code 210 and another malicious code based on each feature. The processor 120 may obtain the final similarity between the malicious code 210 and other malicious code through the similarities obtained from similarity algorithm A 234, similarity algorithm B 235, and similarity algorithm C 236. The processor 120 may apply a weight per similarity algorithm upon obtaining the final similarity, thereby obtaining the final similarity. For example, the processor may assign the weight of n/1 to each of n features 220, obtain the average for the n features, and obtain the obtained average as the final similarity 237. However, the weight of 1/n is merely an example, and the present invention is not limited thereto. Depending on the significance of a particular feature, a different weight may be assigned to each feature. According to various embodiments, the processor 120 may perform visualization based on the obtained final similarity. For example, the processor 120 may visualize the similarity between the plurality of malicious codes in a two-dimensional or three-dimensional space using a graph.

Figure 4:
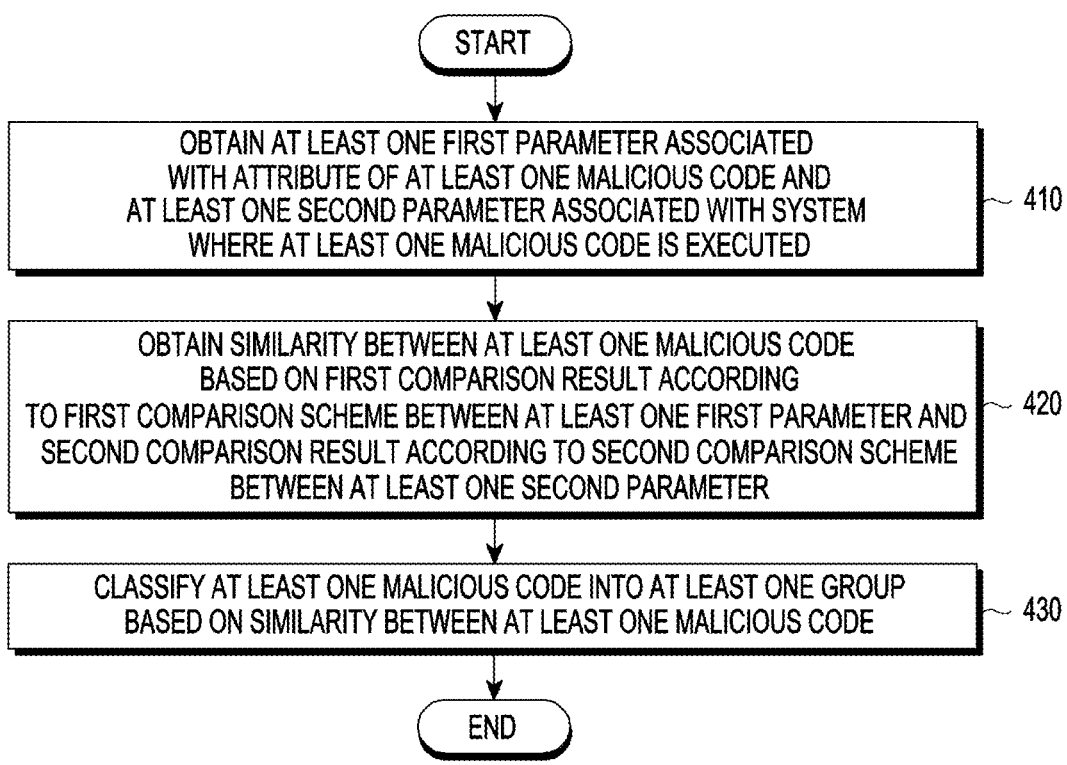
FIG. 4 is a flowchart illustrating an example method for classifying malicious code according to various embodiments.

FIG. 4 is a flowchart illustrating an example method for classifying malicious code according to various embodiments. FIG. 5 illustrates an example of a plurality of first parameters associated with an attribute of malicious code according to various embodiments. FIG. 6 illustrates an example of a plurality of second parameters associated with a system where malicious code is executed according to various embodiments.

In operation 410, a processor (e.g., the processor 120 of FIG. 1) may obtain a plurality of first parameters associated with at least one malicious code and a plurality of second parameters associated with a system where the at least one malicious code is executed. The processor 120 may obtain the plurality of first parameters and the plurality of second parameters via malicious code analysis as described above in connection with FIG. 2. Referring to FIG. 5, the plurality of first parameters may be section information for malicious codes with IDs 1 to 6. The processor 120 may use a group similarity algorithm for the plurality of first parameters respectively corresponding to the malicious codes so as to obtain the similarity between the malicious codes. For example, the processor 120 may obtain the similarity between the malicious codes using a Jaccard similarity measurement method.

Referring to FIG. 6, the plurality of second parameters may be generated by a call sequence of malicious codes with IDs 1 to 6. For example, the plurality of second parameters may be obtained using in-system functions invoked when the malicious code is executed on the system. The processor 120 may use a sequence similarity algorithm to measure the inter-malicious code similarity based on the call sequence of the malicious codes. For example, the processor 120 may measure the inter-malicious code similarity using a Nilsimsa algorithm.

In operation 420 of FIG. 4, the processor 120 may obtain the similarity between the at least one malicious code based on a first comparison result according to a first comparison scheme between the plurality of first parameters and a second comparison result according to a second comparison scheme between the plurality of second parameters. As described above, the processor 120 may apply a group similarity algorithm to the plurality of first parameters associated with the attribute of the malicious code and a sequence similarity algorithm to the call sequence, which is the second parameter associated with the system where the malicious code is executed.

Figure 7A:
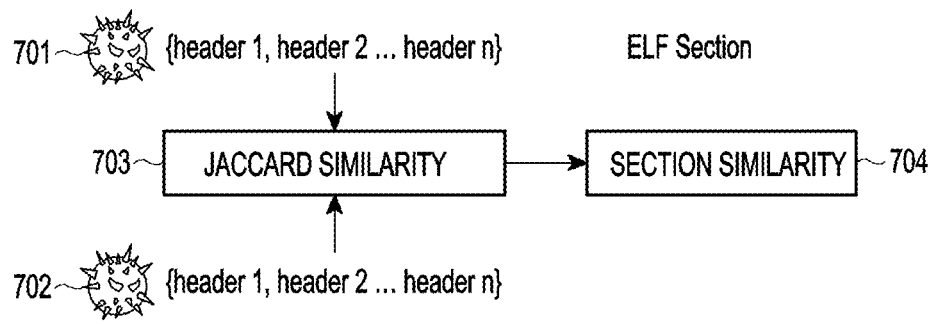
FIGS. 7A and 7B are views illustrating an example configuration of obtaining a Jaccard similarity for various kinds of first parameters.
Figure 7B:
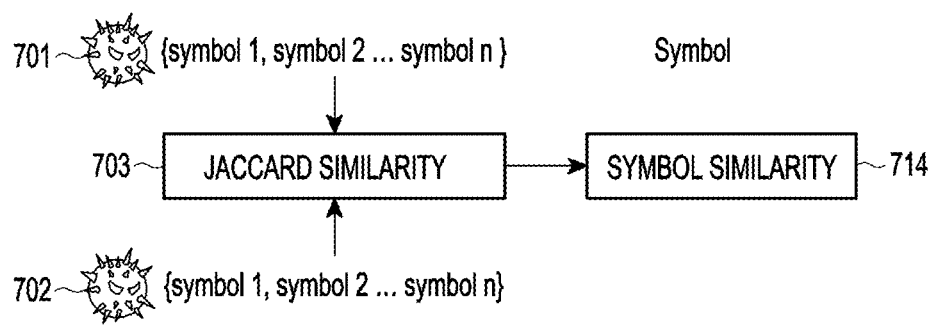

FIGS. 7A and 7B are views illustrating an example configuration of obtaining a Jaccard similarity for various kinds of first parameters.

Referring to FIG. 7A, according to various embodiments, a processor (e.g., the processor 120 of FIG. 1) may set a plurality of first parameters of each of malicious code A 701 and malicious code B 702 as executable and linkable format (ELF) sections of malicious codes A and B. The ELF section may mean most of the information for the linker to analyze the object file. The processor 120 may apply a Jaccard similarity (703) algorithm between the plurality of first parameters of malicious code A 701 and malicious code B 702, determining a section similarity 704.

Similarly, referring to FIG. 7B, according to various embodiments, the processor 120 may set a plurality of first parameters of each of malicious code A 701 and malicious code B 702 as a symbol list of malicious code A 701 and malicious code B 702. The symbol list may include a symbol for a binary file such as an object file or library. The processor 120 may apply the Jaccard similarity (703) algorithm between the plurality of first parameters of malicious code A 701 and malicious code B 702, determining a symbol similarity 714.

Figure 8:
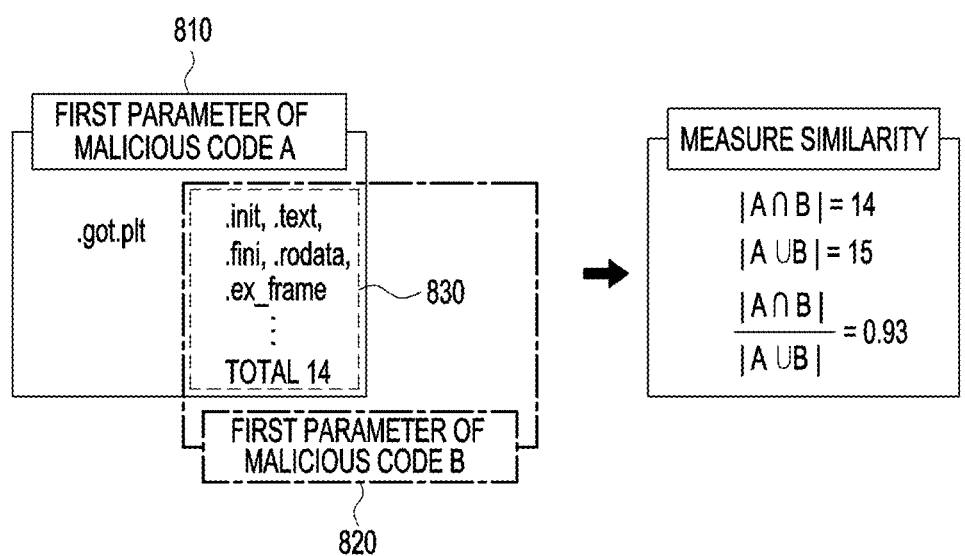
FIG. 8 is a view illustrating a method of obtaining a Jaccard similarity according to various embodiments.

FIG. 8 is a view illustrating a method of obtaining a Jaccard similarity according to various embodiments.

According to various embodiments, a processor (e.g., the processor 120 of FIG. 1) may obtain a similarity using the inclusion relationship between a set 810 of a plurality of first parameters of malicious code A and a set 820 of a plurality of first parameters of malicious code B. For example, referring to FIG. 8, the set 810 of the plurality of first parameters of malicious code A may include a total of 14 parameters in the intersection 830 with the set 820 of the plurality of first parameters of malicious code B. Further, in the area except for the intersection 830 in the set 810 of the plurality of first parameters of malicious code A, one parameter may be included and, in the area except for the intersection 830 in the set 820 of the plurality of first parameters of malicious code B, no parameter may be included. For example, the number of elements of the union of the set 810 of the plurality of first parameters of malicious code A and the set 820 of the plurality of first parameters of malicious code B may be 15. By the Jaccard similarity measurement scheme, the processor 120 may obtain 0.93, which is resultant from dividing the number, 14, of the elements of the intersection of the set 810 of the plurality of first parameters of malicious code A and the set 820 of the plurality of first parameters of malicious code B by the number, 15, of the elements of the union of the set 810 of the plurality of first parameters of malicious code A and the set 820 of the plurality of first parameters of malicious code B, as the Jaccard similarity between malicious code A and malicious code B. Similarly, the processor 120 may obtain the ratio of the size of the intersection of the set 810 of the plurality of first parameters of malicious code A and the set 820 of the plurality of first parameters of malicious code B to the size of the union of the set 810 of the plurality of first parameters of malicious code A and the set 820 of the plurality of first parameters of malicious code B, as the Jaccard similarity between malicious code A and malicious code B.

Figure 9:
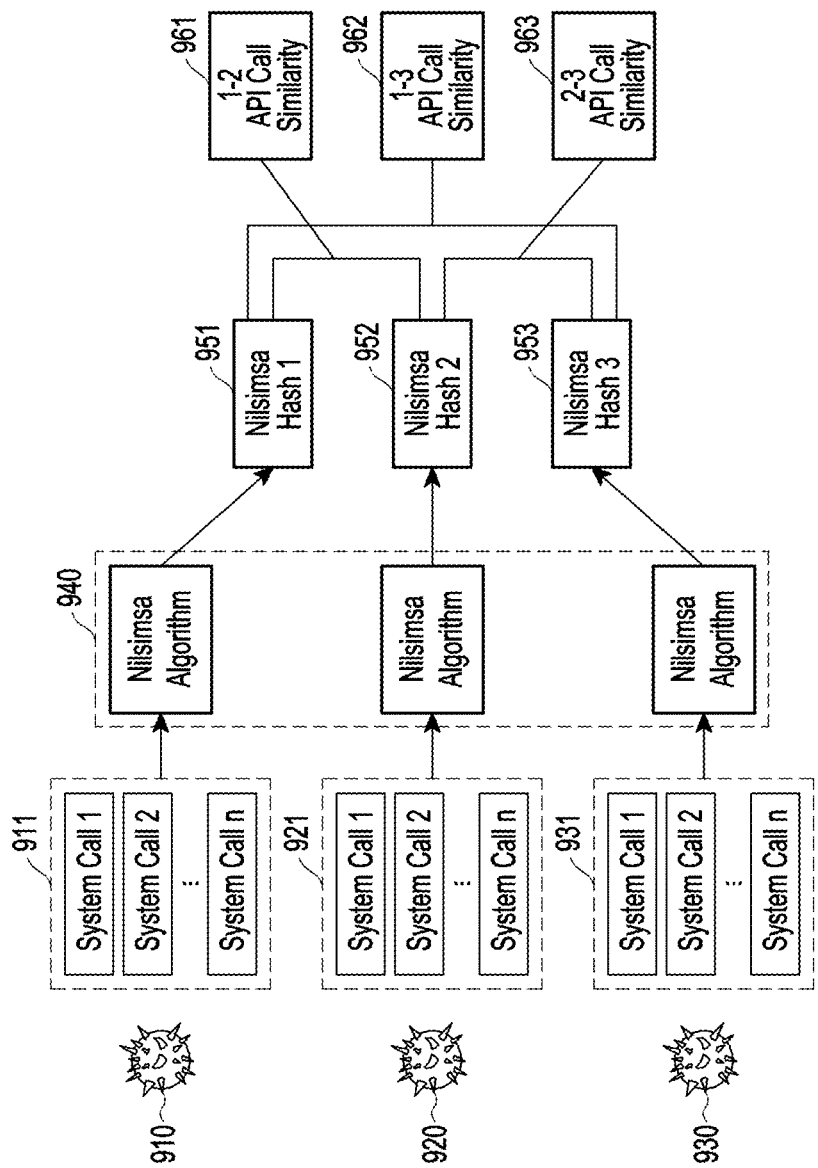

FIGS. 9 and 10 are views illustrating an example of obtaining a Nilsimsa similarity by comparing a plurality of second parameters according to various embodiments.

According to various embodiments, a processor (e.g., the processor 120 of FIG. 1) may obtain a similarity between a plurality of second parameters between malicious codes using a locality sensitive hashing (LSH)-based Nilsimsa algorithm which represents the similarity between strings. The processor 120 may generate a Nilsimsa hash for malicious code via the Nilsimsa algorithm. Since similar malicious codes have similar Nilsimsa hashes, the processor 120 may obtain the Nilsimsa similarity between the malicious codes based on the similarity between the strings included in the Nilsimsa hashes corresponding to the different malicious codes.

Referring to FIG. 9, the processor 120 may obtain call sequences 911, 921, and 931 including n system calls for each of malicious code A 910, malicious code B 920, and malicious code C 930. The processor 120 may input each of the call sequences 911, 921, and 931 to the Nilsimsa algorithm 940, generating Nilsimsa hash 1 951, Nilsimsa hash 2 952, and Nilsimsa hash 3 953. The processor 120 may obtain the Nilsimsa similarity between malicious code A 910, malicious code B 920, and malicious code C 930 by comparing Nilsimsa hash 1 951, Nilsimsa hash 2 952, and Nilsimsa hash 3 953. For example, the processor 120 may obtain a 1-2 API call similarity 961 by comparing Nilsimsa hash 1 951 and Nilsimsa hash 2 952, a 1-3 API call similarity 962 by comparing Nilsimsa hash 1 951 and Nilsimsa hash 3 953, and a 2-3 API call similarity 963 by comparing Nilsimsa hash 2 952 and Nilsimsa hash 3 953.

Referring to FIG. 10, a processor (e.g., the processor 120 of FIG. 1) may obtain the Nilsimsa similarity of malicious codes 1 to 4 with respect to malicious code 1. The processor 120 may generate a Nilsimsa hash for each of the call sequences of malicious codes 1 to 4. The call sequence may include the path, option, variable, or such information used upon invoking a system call. The processor 120 may compare the strings of the Nilsimsa hash of malicious code 1 and the Nilsimsa hashes of malicious codes 2 to 4, obtaining the Nilsimsa similarity.

Figures 11, 12:
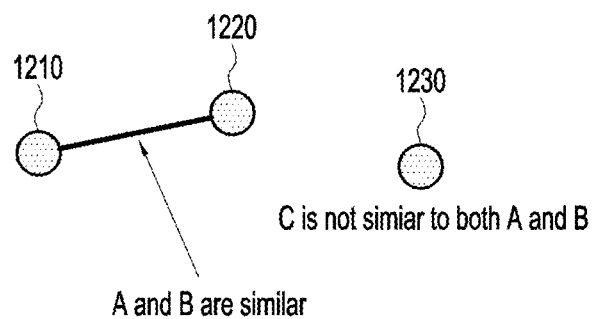
FIG. 11 is a view illustrating an example configuration of obtaining a similarity between malicious codes depending on the result of comparison between parameters according to various embodiments.
FIGS. 12 and 13 are views illustrating an example of visualizing a plurality of malicious codes based on a similarity between malicious codes according to various embodiments.

FIG. 11 is a view illustrating an example configuration of obtaining a similarity between malicious codes depending on the result of comparison between parameters according to various embodiments.

According to various embodiments, the processor 120 may obtain the similarity between malicious codes using the Nilsimsa similarity and the Jaccard similarity obtained in FIGS. 7A, 7B, and 9. The processor 120 may determine that the average of the obtained Nilsimsa similarity and Jaccard similarities is the inter-malicious code similarity. For example, the processor 120 may determine the inter-malicious code similarity by multiplying the Nilsimsa similarity and Jaccard similarities by the weight of ⅓ and summating them. However, the weight of ⅓ is merely an example, and the similarities as per each parameter may be multiplied by different weights and summated, determining the inter-malicious code similarity. For example, when the API call similarity of the malicious code with ID 4 and the malicious code with ID 2 is 0.726, the symbol similarity 0.013, and the section similarity 0.307, the similarity of the malicious code with ID 4 and the malicious code with ID 2 may be obtained as 0.349, which is the average.

In operation 430 of FIG. 4, the processor 120 may classify the at least one malicious code into at least one group based on the obtained similarity. Upon determining that the inter-malicious code similarity is a threshold or more as a result of comparison, the processor 120 may determine that the malicious codes are similar. The processor 120 may generate a network graph using at least one malicious code to visually identify the inter-malicious code similarity.

Figure 13:
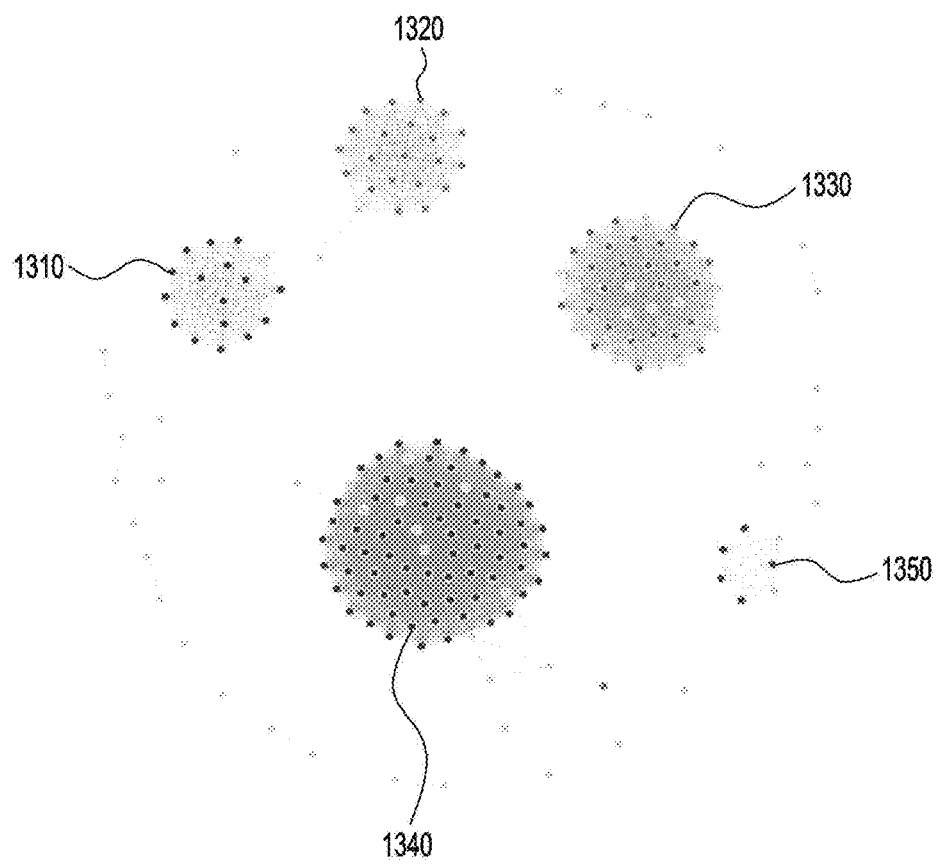

FIGS. 12 and 13 are views illustrating an example of visualizing a plurality of malicious codes based on a similarity between malicious codes according to various embodiments.

Referring to FIG. 12, a processor (e.g., the processor 120 of FIG. 1) may generate a network graph using malicious code A 1210, malicious code B 1220, and malicious code C 1230. For example, upon determining that the similarity is a threshold or more as a result of comparison between malicious code A 1210 and malicious code B 1220, the processor 120 may connect malicious code A 1210 and malicious code B 1220 using an edge, thereby visually representing the similarity between malicious code A 1210 and malicious code B 1220. Upon determining that malicious code C 1230 is not similar to malicious code A 1210 and malicious code B 1220, the processor 120 may visually represent the same by refraining from connecting malicious code C 1230 and malicious code A 1210 and malicious code B 1220 using an edge.

Referring to FIG. 13, the processor (e.g., the processor 120 of FIG. 1) may expand the two-dimensional network graph of FIG. 12 into three dimensions and visually represent the inter-malicious code similarity. The processor 120 may connect the malicious codes with similarities not less than the threshold as a result of the comparison, thereby visualizing them as a plurality of groups 1310, 1320, 1330, 1340, and 1350. Upon discovery of a new malicious code, the processor 120 may identify a group similar to the new malicious code by comparison with the malicious codes included in the plurality of groups 1310, 1320, 1330, 1340, and 1350.

According to various embodiments, an electronic device (e.g., the electronic device 101 of FIG. 1) comprises a processor (e.g., the processor 120 of FIG. 1) and a memory (e.g., the memory 130 of FIG. 1) electrically connected to the processor 120, wherein the processor 120 may be configured to obtain a plurality of first parameters associated with an attribute of at least one malicious code and a plurality of second parameters associated with a system where the at least one malicious code is executed, obtain a similarity between the at least one malicious code based on a first comparison result according to a first comparison scheme between the plurality of first parameters and a second comparison result according to a second comparison scheme between the plurality of second parameters, and classify the at least one malicious code into at least one group based on the similarity between the at least one malicious code.

According to an embodiment, the plurality of first parameter may be determined based on at least one of a name, file type, file size, and header information of the at least one malicious code. According to an embodiment, the processor 120 may be configured to obtain the plurality of second parameters by comparing strings of call sequences generated when the malicious code is executed on the system. According to an embodiment, the first comparison scheme may include a Jaccard similarity measurement scheme, and the second comparison scheme includes a Nilsimsa similarity measurement scheme. According to an embodiment, the processor 120 may be configured to obtain a ratio of an intersection to union of a set of the plurality of first parameters of a first malicious code of the at least one malicious code and a set of the plurality of first parameters of a second malicious code of the at least one malicious code, as a Jaccard similarity. According to an embodiment, the processor 120 may be configured to obtain the similarity based on an average of the first comparison result and the second comparison result. According to an embodiment, the processor 120 may be configured to, when a similarity between a first malicious code and second malicious code of the at least one malicious code is a threshold or more, classify the first malicious code and the second malicious code into the same group. According to an embodiment, the processor 120 may be configured to generate a network graph of the at least one malicious code based on the similarity between the at least one malicious code and the at least one group.

According to various embodiments, a method of classifying malicious code may comprise obtaining a plurality of first parameters associated with an attribute of at least one malicious code and a plurality of second parameters associated with a system where the at least one malicious code is executed, obtaining a similarity between the at least one malicious code based on a first comparison result according to a first comparison scheme between the plurality of first parameters and a second comparison result according to a second comparison scheme between the plurality of second parameters, and classifying the at least one malicious code into at least one group based on the similarity between the at least one malicious code.

According to an embodiment, the plurality of first parameter may be determined based on at least one of a name, file type, file size, and header information of the at least one malicious code. According to an embodiment, obtaining the plurality of second parameters may include obtaining the plurality of second parameters by comparing strings of call sequences generated when the malicious code is executed on the system. According to an embodiment, the first comparison scheme may include a Jaccard similarity measurement scheme, and the second comparison scheme includes a Nilsimsa similarity measurement scheme. According to an embodiment, obtaining the similarity may include obtaining a ratio of an intersection to union of a set of the plurality of first parameters of a first malicious code of the at least one malicious code and a set of the plurality of first parameters of a second malicious code of the at least one malicious code, as a Jaccard similarity. According to an embodiment, the method may further include obtaining the similarity based on an average of the first comparison result and the second comparison result. According to an embodiment, classifying the at least one malicious code into the at least one group based on the obtained similarity may include, when a similarity between a first malicious code and second malicious code of the at least one malicious code is a threshold or more, classifying the first malicious code and the second malicious code into the same group. According to an embodiment, the method may further include generating a network graph of the at least one malicious code based on the similarity between the at least one malicious code and the at least one group.

According to various embodiments, there is provided a non-transitory computer-readable recording medium retaining a program executed on a computer, wherein the program may be executed by a program 120 to enable the processor 120 to perform the operations of classifying malicious code which may comprise obtaining a plurality of first parameters associated with an attribute of at least one malicious code and a plurality of second parameters associated with a system where the at least one malicious code is executed, obtaining a similarity between the at least one malicious code based on a first comparison result according to a first comparison scheme between the plurality of first parameters and a second comparison result according to a second comparison scheme between the plurality of second parameters, and classifying the at least one malicious code into at least one group based on the obtained similarity.

According to an embodiment, the at least one first parameter may be determined based on at least one of a name, file type, file size, and header information of the at least one malicious code. According to an embodiment, the processor 120 may perform the operation of obtaining the plurality of second parameters by comparing strings of call sequences generated when the malicious code is executed on the system. According to an embodiment, the first comparison scheme may include a Jaccard similarity measurement scheme, and the second comparison scheme includes a Nilsimsa similarity measurement scheme.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
a processor; and
a memory electrically connected to the processor,
wherein the processor is configured to:
   obtain a plurality of first parameters associated with an attribute of at least one malicious code and a plurality of second parameters associated with a system where the at least one malicious code is executed, wherein the plurality of first parameters are determined based on at least one of a name, a file type, a file size, or header information of the at least one malicious code, and the plurality of second parameters are obtained by comparing strings of call sequences generated when the malicious code is executed on the system;
   obtain a similarity between the at least one malicious code based on a first comparison result according to a Jaccard similarity measurement scheme between the plurality of first parameters and a second comparison result according to a Nilsimsa similarity measurement scheme between the plurality of second parameters, wherein the similarity is determined by applying different weights to the first comparison result and the second comparison result;
   classify the at least one malicious code into at least one group based on the similarity between the at least one malicious code; and
   generate a network graph of the at least one malicious code based on the similarity between the at least one malicious code and the at least one group.

2. The electronic device of claim 1, wherein the processor is configured to obtain a ratio of an intersection to union of a set of the plurality of first parameters of a first malicious code of the at least one malicious code and a set of the plurality of first parameters of a second malicious code of the at least one malicious code, as a Jaccard similarity.

3. The electronic device of claim 1, wherein the processor is configured to, when a similarity between a first malicious code and second malicious code of the at least one malicious code is a threshold or more, classify the first malicious code and the second malicious code into the same group.

4. A method of classifying malicious code, the method comprising:
  obtaining a plurality of first parameters associated with an attribute of at least one malicious code and a plurality of second parameters associated with a system where the at least one malicious code is executed, wherein the plurality of first parameters are determined based on at least one of a name, a file type, a file size, or header information of the at least one malicious code, and the plurality of second parameters are obtained by comparing strings of call sequences generated when the malicious code is executed on the system;
  obtaining a similarity between the at least one malicious code based on a first comparison result according to a Jaccard similarity measurement scheme between the plurality of first parameters and a second comparison result according to a Nilsimsa similarity measurement scheme between the plurality of second parameters, wherein the similarity is determined by applying different weights to the first comparison result and the second comparison result;
  classifying the at least one malicious code into at least one group based on the similarity between the at least one malicious code; and
  generating a network graph of the at least one malicious code based on the similarity between the at least one malicious code and the at least one group.

5. The method of claim 4, wherein obtaining the similarity includes obtaining a ratio of an intersection to union of a set of the plurality of first parameters of a first malicious code of the at least one malicious code and a set of the plurality of first parameters of a second malicious code of the at least one malicious code, as a Jaccard similarity.

6. The method of claim 4, wherein classifying the at least one malicious code into the at least one group based on the obtained similarity includes, in response to a similarity between a first malicious code and second malicious code of the at least one malicious code being a threshold or more, classifying the first malicious code and the second malicious code into the same group.

7. A non-transitory computer-readable recording medium retaining a program that, when executed by a processor, enable the processor to perform operations of classifying malicious code comprising;
  obtaining a plurality of first parameters associated with an attribute of at least one malicious code and a plurality of second parameters associated with a system where the at least one malicious code is executed, wherein the plurality of first parameters are determined based on at least one of a name, a file type, a file size, or header information of the at least one malicious code, and the plurality of second parameters are obtained by comparing strings of call sequences generated when the malicious code is executed on the system,
  obtaining a similarity between the at least one malicious code based on a first comparison result according to a Jaccard similarity measurement scheme between the plurality of first parameters and a second comparison result according to a Nilsimsa similarity measurement scheme between the plurality of second parameters, wherein the similarity is determined by applying different weights to the first comparison result and the second comparison result,
  classifying the at least one malicious code into at least one group based on the similarity between the at least one malicious code, and
  generating a network graph of the at least one malicious code based on the similarity between the at least one malicious code and the at least one group.

* * * * *